United States Patent [19]
Tytgat et al.

[11] Patent Number: 5,596,428
[45] Date of Patent: Jan. 21, 1997

[54] COLOR MATCHING BY SYSTEMS CALIBRATION, LINEAR AND NON-LINEAR GAMUT MAPPING

[75] Inventors: Bart Tytgat, Grimbergen; Paul Dierckx, Brussels, both of Belgium

[73] Assignee: Agfa-Gevaert N.V., Mortsel, Belgium

[21] Appl. No.: 426,985

[22] Filed: Apr. 21, 1995

[30] Foreign Application Priority Data

May 26, 1994 [EP] European Pat. Off. .............. 94201495

[51] Int. Cl.$^6$ ..................................................... H04N 1/60
[52] U.S. Cl. ........................................... 358/518; 358/520
[58] Field of Search ..................................... 358/504, 518, 358/523, 520, 447, 448; 382/167; H04N 1/60

[56] References Cited

U.S. PATENT DOCUMENTS

4,941,039  7/1990  D'Errico ................................. 358/523
5,241,373  8/1993  Kanamori et al. ....................... 358/518
5,339,176  8/1994  Smilansky et al. ...................... 358/518

*Primary Examiner*—Kim Vu
*Attorney, Agent, or Firm*—Brumbaugh, Graves, Donohue & Raymond

[57] ABSTRACT

A color matching method is described for matching the appearance of an image on a second color imaging system to an image on a first color imaging system. The method is based on the calibration of both imaging systems, preferentially by analytical functions having specific continuity requirements, approximating measured points rather than interpolating them. Due to different gamuts of the two imaging systems, a gamut mapping must be performed. The mappings are preferentially linear for lightness and saturation, and preferentially keep the hue constant. For greyish colors, the gamut mapping is preferentially non-linear, to obtain maximum visual perception of differences in the image.

18 Claims, 3 Drawing Sheets

COLOR MATCHING BY SYSTEMS CALIBRATION, LINEAR AND NON-LINEAR GAMUT MAPPING

DESCRIPTION

1. Field of the Invention

The present invention relates to a method for reproducing a colour image by a colour output device. The method is specifically useful for the reproduction on a three colour thermosublimation printer of a medical diagnostic colour image viewed on a colour monitor.

2. Background of the Invention

In medical diagnostic imaging, the use of colours can enhance the diagnostic value of an image. Traditionally tissues and bones are represented by grey tones, whereas blood vessels or the speed of tissue-fluids can be represented in coloured tones. Many diagnostic systems present colour images on a video monitor for the radiologist. Physicians used to these colour representations, also want that the hard copies of these images look the same as what is observed on the video monitor. One advantage of coloured representations of diagnostic images is that, apart from grey, a lot of other colours, clearly discernible from grey and from each other, can be displayed. The amount of different image levels that can be represented thereby increases dramatically. It is therefore necessary that the hard copy reproduction of the diagnostic image can represent at least the same amount of image levels. Moreover, it is important to keep the visual appearance of the colours on the hard copy as close as possible to the colours on the video monitor. It has been found that by using traditional techniques for colour matching, some colours tend to look completely different on the hard copy from the original colour on the colour monitor. This is especially true for blue regions on the monitor that tend to be rendered purple when the hard copy is corrected by traditional colour correction techniques.

Since more than 50% of the diagnostic information is displayed in grey on diagnostic images, it is important to make sure that neutral grey on the hard copy gets special attention. In thermosublimation, where colours in varying densities are printed on top of each other, colour mixing or reduction occurs during the process. This makes the composition of colours for neutral grey highly non-linear.

On video monitors, the grey levels, that are not clearly discernible from each other, can be selectively enhanced by window/level procedures. Once the image has been printed on hard copy, these procedures are not possible any more. It has been found that by traditional colour matching techniques the visual perception for a lot of grey levels—especially in the dark areas—becomes difficult.

It is also known that the colour gamuts of two different devices have a common part, and disjunct parts. Especially the colours that can be represented by the video monitor and not on the hard copy give a problem. Traditional colour matching systems match a set of "out of gamut" colours to one single colour on the "gamut boundary", or map all colours outside the gamut of a device to a specific zone close to the border of the gamut for that device. Colour points well inside the gamut are linearly mapped. As they reach or cross the gamut boundary, they are transformed such that they reach asymptotically the gamut boundary. On the other hand, some colours available in the hard copy device are totally unused, because none of these colours can be rendered on the video monitor. The restriction of one to one mapping within the common part of the gamut and mapping to the boundary of the gamut of the reproduction device results in a loss of information representation capabilities of the reproduction device.

Some colour transformation systems introduce contouring in the reproduction, where no contours were visible on the original image. These contours can be introduced by too steep gradients in the colour transformation function. Steep gradients can be due to measurement errors in the data that characterise one or both systems that deliver the images being matched.

3. Objects of the Invention

It is a first object of the invention to improve the visual perception of the reproduction of a colour image.

It is a second object of the invention to avoid contouring in the reproduction, where this was not present in the original image.

SUMMARY OF THE INVENTION

In accordance with the present invention, a method is disclosed for reproducing a colour image represented by input colour signals i in a system comprising:

a first colour imaging system driven by said input colour signals i for imaging said colour image, each colour of said colour image having colour coordinates c in a pre-defined colour coordinate system and a second colour imaging system driven by output colour signals o for imaging the reproduction of said colour image, each colour of said reproduction having colour coordinates c' in said pre-defined colour coordinate system;

and for obtaining a colour appearance match between:

said colour image on said first colour imaging system and said reproduction on said second colour imaging system;

comprising the following steps:

determining, by calibrating the first imaging system, a first transformation M: c=M(i) that transforms the input colour signals i to the colour coordinates c;

determining, by calibrating the second imaging system, a second transformation P: c'=P(o) that transforms the output colour signals o to the colour coordinates c';

deriving from said first and second transformation a colour transformation T: o=T(i) for transforming said input colour signals i to said output colour signals o;

producing an output colour signal o from each said input colour signal i from the image, according to said colour transformation T and driving said second imaging system by said output signals o to reproduce said colour image.

It is advantageous to transform all grey levels from the first system to all available grey levels from the second system. This is done by mapping the white point from the first system to the white point from the second system, and by mapping the black point from the first system to the black point from the second system. This option will make sure that the full range of grey levels of the second system can be used optimally. It is even more advantageous to map all intermediate grey levels from the first system to a grey distribution on the second system, such that there is an optimal visual perception of the different grey levels on the second system. This will optimise the number of information levels visible on the output of the second system.

The reproduction of a colour image for which the input colour signals are given, can best be done by calibrating the first system where the colour image is represented and by calibrating the second system where the reproduction of the colour image is presented. The transformation for the input colour signals can then be derived from the calibration data. Calibration is mapping each value of device coordinates to the corresponding values in a universal colourimetric system such as CIE tristimulus values to establish a relation between the device signals (i or o) and the colour tristimulus values (c or c') obtained by the imaging system.

Apart from the calibration data, preferably a gamut mapping for the two imaging systems must be performed. The gamut of a system is the set of possible colours that can be created by that system. The gamut can be represented by a three dimensional solid in a tristimulus value coordinate system.

The boundary of the system gamut can be defined as being the envelope of the measurements taken to build the calibration table.

DETAILED DESCRIPTION OF THE INVENTION

The invention is described hereinafter by way of example with reference to the accompanying figures wherein.

Figure 1:
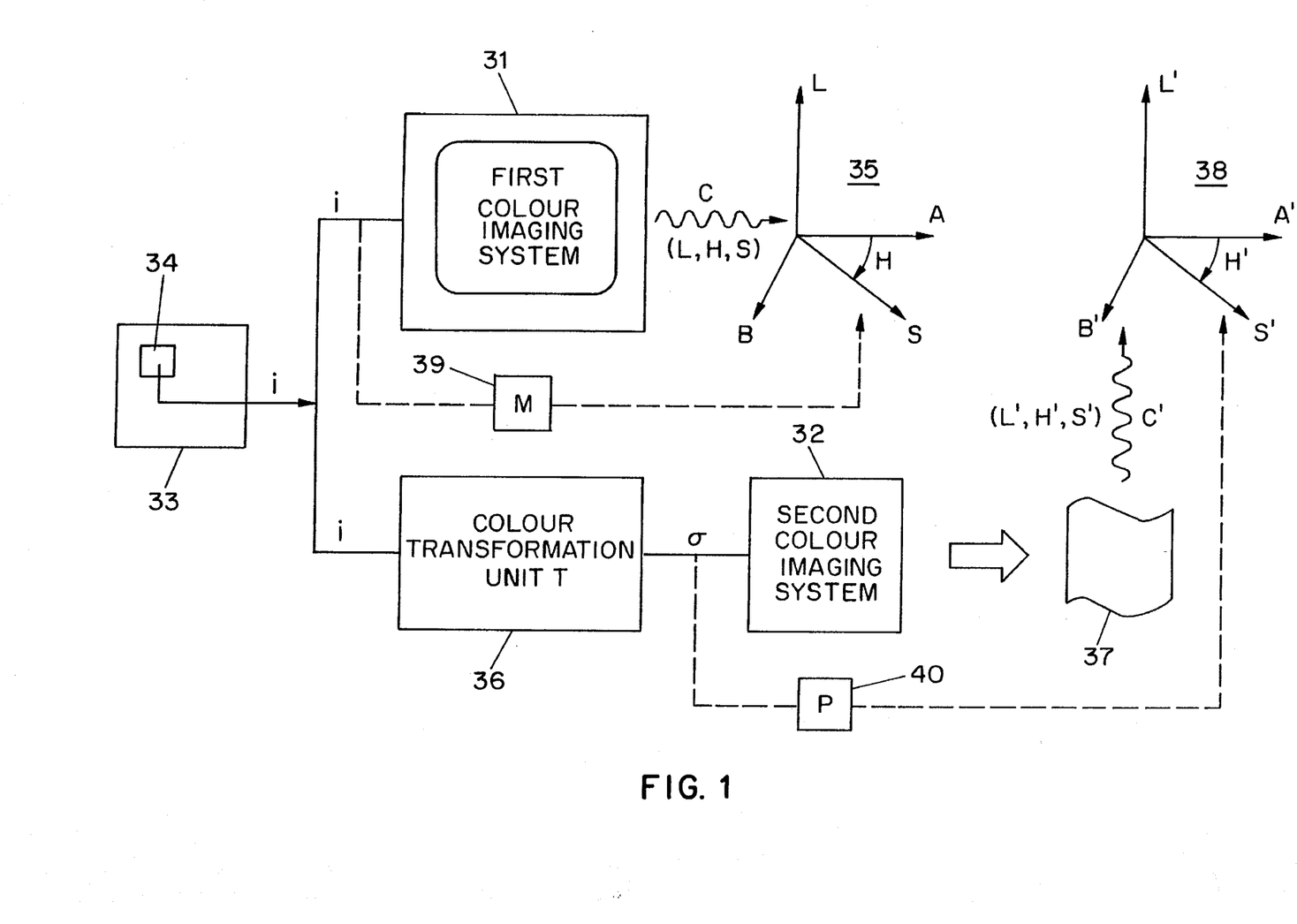
FIG. 1 is a schematic view of a system comprising a first and a second colour imaging system.

In FIG. 1 a first colour imaging system 31 and a second colour imaging system 32 are represented. Although the method of the present invention can also be applied to other combinations of first and second imaging systems, we could imagine here that the first imaging system 31 is a system comprising a frame store (not shown) and a colour video monitor, while the second imaging system 32 is a thermosublimation colour printer. The thermosublimation printer can be an IMPAX Drystar system. This system is marketed by Agfa-Gevaert N. V. in Mortsel, Belgium. A frame store is a device that typically receives digital input colour signals i from a device storing the digital image information 33. A digital image is typically composed of image pixels 34, each pixel representing the information of a square or rectangular portion of the image 33. In a medical environment, such a digital image can be obtained by irradiating a human body with X-rays and scanning the transmitted radiation by a CT-scanner. The amount of transmitted radiation at one location of the body is sampled and quantised in a digital number, representing one pixel. Also MR-scanners and ultra sound systems deliver digital images, representing certain characteristics of the human body. In the graphics art, digital colour images can be obtained by illumination and scanning an original image on an opaque or transparent sheet. This can be realised for example by the Horizon Plus scanner, a system marketed by Agfa-Gevaert N.V. in Mortsel, Belgium.

Each pixel typically corresponds with an input colour signal i, composed of three colour components that can be indicated by (r,g,b). The r signal component will typically modulate the electron beam on the video monitor 31 that is incident on the red phosphor, the g component will modulate the light of the green phosphor and the b component will modulate the light beam for the blue phosphor. The input colour signal i can thus be represented by a device coordinate (r,g,b). Every other device coordinate (r,g,b) will give another colour c observed on the video monitor. This colour c can be measured and represented in a device independent tristimulus colour coordinate system such as the CIE XYZ system. This gives for the colour c the coordinates (X,Y,Z). These coordinates can be further transformed to a space where equal euclidian distances are observed by a standard observer as equal colour differences. The CIE L*a*b* space has this property. The transformation formula for this conversion are well known in the art. A space related to this space is the CIE 1976 lightness L*, CIE 1976 chroma $C^*_{ab}$, CIE 1976 hue angle $h_{ab}$ system. Different from the CIE XYZ and CIE L*a*b* systems, which are cartesian systems the (L*, $C^*_{ab}$, $h_{ab}$) system is a polar system. This means that L* can theoretically take all values, practically all positive value; $C^*_{ab}$ can effectively take only positive values, because it represents a radius: and $h_{ab}$ can take values between 0° and 360° . This system gives a good visual representation of a colour as a lightness or intensity, the colourfulness or saturation and the colour type characterised by the hue angle. Every colour can be represented in the (L*, $C^*_{ab}$, $h_{ab}$) system. More polar systems exist however that correspond to akin of qualitative colour perception, and that we will indicate here as (L,H,S): lightness, hue and saturation and shown in FIG. 1 under numeral 35. This way, every colour c as observed from the colour monitor 31 can be characterised by three polar coordinates (L,H,S) and as such represented in an (L,H,S) coordinate system.

The input image signals i can now be sent directly to a second colour imaging system 32. This can be done as shown in FIG. 1 by setting T in the colour transformation unit 36 to the unity transformation, such that o=i. All the possible output colour signals o for the second colour imaging system can be represented by the coordinates (c,m,y). If the second system 32 is a thermosublimation printer, then the first coordinate value c (cyan) is proportional to the amount of heat applied locally to the thermal head of the printer to transfer dye from a cyan dye donor to the hard copy 37. This will have as a result that a certain amount of the dye is deposit on the hard copy, giving locally a specific density. The coordinate value m is proportional to the heat applied to the thermal head when the magenta dye is deposit, and y is proportional to the heat applied when the yellow dye is deposit. The deposit of these three dyes on top of each other gives a colour c', that can be measured in the generalised polar coordinate system (L,H,S), giving now coordinates (L',H',S') in the L'H'S' system 38. It is very likely that, when o=(c,m,y) is chosen to be equal to i=(r,g,b), the colours of the corresponding image locations of the original image and the reproduction will be different. In order to obtain a colour match c'=c, the transformation T must be selected such that this equation holds.

Therefore, the first colour imaging system 31 can be modelled as a first transformation system 39 that transforms the input colour signals i=(r,g,b) to a colour c=(L,H,S). The transformation model can be mathematically described by a transformation M that transforms i to c or c=M(i). This transformation is in fact a transformation from the three dimensional device space (r,g,b) of the first colour imaging system 31 to the three dimensional (L,H,S) colour space, and can be mathematically described by three different functions of three variables:

$$L=L(r,g,b)$$

$$H=H(r,g,b)$$

$$S=S(r,g,b)$$

The same can be said for the second colour imaging system 32, that can be modelled as a second transformation system 40. This system transforms the output colour signal o=(c,m,y) to the colour coordinates c'=(L',H',S'), by the transformation c'=P(o). The transformation P can mathematically be described by three other different functions, each of three variables:

$$L'=L'(c,m,y)$$

$$H'=H'(c,m,y)$$

$$S'=S'(c,m,y)$$

Figure 2:
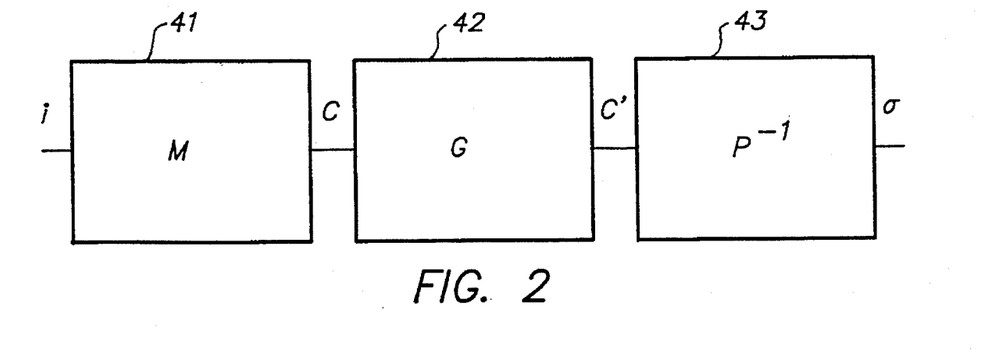
FIG. 2 is a schematic representation of the transformations applied to the input colour signals to obtain the output colour signals.

We will discuss below how these transformations M and P can be obtained. First we will discuss how the transformations M and P can be used to obtain a colour match between the colour image and its reproduction. We therefore refer to FIG. 2. This figure represents the transformations that must be applied to the input colour signals i to obtain output colour signals o that will result in a colour c' on the second imaging system, matching the colour c obtained on the first imaging system driven by input signals i. The input signals i are first transformed by the first transformation M to the colour signals c. This is done in the first transformation unit 41. These colour signals c represent the colour in which the input signals i will be represented on the first imaging system. This colour c must be obtained on the second imaging system for a one-to-one match. For a one-to-one match, we can make abstraction of the gamut transformation unit 42, or imagine that G transforms c to c' in a one-to-one fashion. This can be mathematically described as: c'=c or:

$$L'=L$$

$$H'=H$$

$$S'=S$$

At this time, the colour (L',H',S') is known that must be obtained on the second imaging device. The problem is now to find the corresponding output colour signals o=(c,m,y) to obtain such colour c'=(L',H',S'). Because the transformation c'=P(o) is known, the output colour signals o can be obtained from the colour c' by inversion of the transformation P: $o=P^{-1}(c')$. Several techniques are known in the art to compute the inverse transformation. If the transformation P is linear, then matrix inversion can be used. If the transformation P is non-linear, then it can be linearised in small subareas of the space by e.g. the Taylor series. The problem can then also be solved by matrix inversion, and the inverse transformation can be performed by the inverse transformation unit 43.

In the above case, the colour transformation T that transforms the input colour signals i to the output colour signals o can be characterised by $T=P^{-1}{}_oM$. The colour transformation can thus be derived from a combination of the first transformation M and the second transformation P. Once the transformation T is known, every input colour signal i for subsequent image pixels can be offered to the colour transformation unit 36 in FIG. 1 that transforms the input colour signal i=(r,g,b) according to the transformation T to the output colour signal o=(c,m,y). The resulting output signal o=(c,m,y) can be offered to the second colour imaging system 32, that produces the required image reproduction 37.

For some colours c'=c, it has no sense to attempt the inversion of P, just because that colour c' cannot be produced by the second imaging system, which means that c is situated outside the gamut of the second imaging device. Such colours c must be mapped to other colours c' that are within the gamut of the second imaging device. Therefore, a gamut transformation G must be defined, that transforms the colours obtained by the first imaging system to colours obtainable by the second imaging system c'=G(c). This is represented in the gamut transformation unit 42 in FIG. 2. The colour transformation T can then mathematically be represented by:

$$T=P^{-1}{}_oG_oM.$$

The transformation T must be applied to all pixels 34 of the input image 33. This can preferentially be done by pre-computing o=T(i) the output colour signals o=(c,m,y) for a reduced set of all possible input colour signals i=(r,g,b). The reduced set can be arranged on the vertices of sub-cubes or sub-parallelepipeds of the cube formed by all possible input colour signals i=(r,g,b). For all pixels that have input colour signals i located on these vertices, the pre-computed output colour signal o=(c,m,y) can be taken as the transformed value. For all input colour signals i not located on these vertices, trilinear interpolation can be used or the sub-solid can be divided in five or six tetrahedrons and the output colour signal computed as a weighted sum of the four output colour signals on the vertices of the tetrahedron to which the input colour signal belongs. These techniques are well known in the art and published for example in the U.S. Pat. No. 5,241,373, in "Fast colour processor with programmable interpolation by small memory (PRISM)" by Katsuhiro Kanamori et al. in Journal of Electronic Imaging, July 1993, Vol/ 2(3) pp. 213, and the British patent application GB 2,260,669.

We will now discuss how the first transformation M can be identified. To fully describe the transformation M, it is sufficient to know for every input colour signal i=(r,g,b), which colour c=(L,H,S) is obtained on the first imaging system. This could theoretically be done by sending all possible combinations (r,g,b) to the first imaging system and measuring the colour signal c. There are practical obstacles for this. First of all, most systems offer 256 possible values for r, g and b. This gives more than sixteen million possible input colour signals. Therefore, a reduced set of possible input colour signals is selected to measure the system response. This set can be composed by input signals $(r_k,g_l,b_j)$, where a number of K samples $r_k$ is a subset of all possible values for r at equal or different intervals. If for example K is 9 and r can take the values 0 to 255, then $r_k$ could be selected as: (0, 32, 64, 96, 128, 160, 192, 224, 255). We found that for a monitor it is sufficient to select K,L,J=6 for the red, green and blue signals respectively. The values can be taken equidistantly as follows: (0, 51, 102, 153, 204, 255). This gives 216 triplets from all possible combinations. It is possible to further reduce the computational effort by elimination of some of these 216 triplets, if the neighbouring triplets of the omitted triplets are representative for their value. If the first imaging system has a non-linear response, then it is advantageous to select the $r_k$ values not equidistant. The values for $r_k$ are then selected such that the system response for input colour signal $(r_{k+1},0,0)$ gives approximately always the same increments in L and S with respect to the system response for input colour signal $(r_k,0,0)$, for all possible values for k. For g and b independent subsets are created and these subsets are combined to deliver the subset $i_{klj}$ of all possible input colour signals i. If the number K of samples $r_k$ is 6, the number L of samples $g_l$ is 6 and the number J of samples $b_j$ is 6, then the subset $i_{klj}$ contains 6×6×6=216 samples.

This restricted set of input colour signals—consisting e.g. of 216 samples—is sent to the first imaging device and the colours $c_{klj}$ are measured. By this operation, the transformation M is known in only a restricted set of possible input colour signals $i_{klj}$. To be useful, the transformation M must be defined also for all other possible input colour signals i. Traditionally trilinear interpolation or other piecewise linear interpolation techniques are used, as for example in EP 0 488 655 A2 and in "Color Gamut Mapping and the Printing of Digital Color Images" by Maureen C. Stone et al. published in ACM Transactions on Graphics, Vol. 7, No. 4, October 1988, Pages 249–292. Interpolation means that, whenever the technique is used to compute the colour coordinates c, corresponding to the input colour signals i that coincide with $i_{klj}$ from the restricted set, the measured colour coordinates $c_{klj}$ are obtained.

We have found however that the colour $c_{klj}$ obtained from the input colour signal $i_{klj}$ can be location dependent (e.g. the mid point or the corner points of the monitor), apart from being defined by the input colour signal i. Also other fluctuations of the imaging device and of the measurement device, that measures the colour coordinates $c_{klj}$, make that an exact relation c=M(i) does not exist and cannot be measured. Due to these restrictions, a piecewise linear interpolation of the measured points to obtain a complete definition of the transformation c=M(i) gives a lot of problems. One such problem is the appearance of contouring. If for example one measurement gives a $(L,H,S)_{klj}$ colour for which L is too low due to measurement errors, location dependency or random fluctuations, and another measurement gives a $(L,H,S)_{k+1lj}$ colour for which L is too high due to one of these reasons, all input colour signals between $(r_k,g_l,b_l)$ and $(r_{k+1},g_l,b_l)$ will be imaged to colours having a very different L value. A smooth transition between these input colour signals will result in colours being so different that they can easily be distinguished. This will result in contouring. Due to these fluctuations, input colour signals outside this interval can be transformed to colour values that are too close to each other to tell the difference, even if the input colour signals are substantially different. In medical imaging this will reduce the diagnostic value of the affected zones in the image.

For these reasons, we have found an important advantage by approximating the measured data by a smooth function and in such a way that the measured data are averaged. An approximation differs from interpolation by the fact that the approximation is not interpolating the measured data in at least one measured point. Whereas the coefficients for an interpolation function are mostly found by solving a determined set of equations, the coefficients for an approximation are mostly found by solving an over-determined set of equations. Therefore an object function—e.g. the sum of quadratic deviations, possibly with other restrictions—can be minimised, giving a regular set of equations. An example is a linear regression, where the transformation is approximated by a 3×3 matrix transformation and an offset vector having three elements. Twelve coefficients must then be computed based on the measured points. Preferentially the cartesian system (r,g,b) is transformed to another cartesian system (L,A,B), wherein (L,A,B) is directly obtained by the transformation of the polar system (L,H,S) to (L,A,B) by the formula:

$$A=S*\cos(H)$$

$$B=S*\sin(H)$$

The general form for the linear regression is:

$$L=c_{Lr}*r+c_{Lg}*g+c_{Lb}*b+L_0$$

$$A=c_{Ar}*r+c_{Ag}*g+c_{Ab}*b+A_0$$

$$B=c_{Br}*r+c_{Bg}*g+c_{Bb}*b+B_0$$

The transformation M is however highly non-linear, such that it cannot be approximated by one linear regression. Piecewise linear regressions could be used, but these lack ordinary continuity or continuity of the first and higher derivatives at the input colour signals that are common to two regressions. We have found that the measured data can be better approximated by piecewise polynomial approximations that have extra restrictions on the continuity of the first and second derivatives. Spline functions are of this type. By approximating the measured data with this type of parametric functions, a more faithful reproduction could be obtained than available with a linear regression and the contouring problem of other methods using global polynomial approximations or global or piecewise interpolations completely disappeared. Algorithms for approximating a set of measured points in a three-dimensional space can be found in "Curve and Surface Fitting with Splines", by P. Dierckx, edited by the Oxford University Press. The transformation M is expressed as a transformation from the (r,g,b) space to the (L,A,B) space and can be represented by the following three expressions:

$$L=f_{L(r,g,b)}$$

$$A=f_{A(r,g,b)}$$

$$B=f_{B(r,g,b)}$$

The three functions $f_L$, $f_A$ and $f_B$, each of the same three variables (r,g,b), are totally independent from each other, and to find the coefficients for each function, a specific object function is minimised. The coefficients for the first function are found by minimisation of the sum of quadratic differences $\Delta L$. For the second function, the object function specifies in the same way $\Delta A$, and the third function minimises $\Delta B$. As such the visual colour distances in each dimension are minimised and the weight given to a colour difference between the continuous model and the discrete measured points corresponds with the human appreciation of such colour difference. Therefore, the generalised polar coordinate system is transformed to the corresponding cartesian system by the above transformation from (L,H,S) to (L,A,B). As such the obtained spline function will approximate the measured data in a sense of closest psychometric relation.

For the calibration of the first imaging system, also another method can be used, especially if the first imaging system is a colour video monitor. For most colour video tubes, the characteristics of the phosphors used are known accurately. The spectral curves—i.e. the radiation as a function of the wave length—of each phosphor at different excitation levels of the electron beam is known. From this knowledge, a mathematical model can be established, giving the colour output of the video monitor as a function of the input colour signals. This way, the transformation c=M(i) is established. For each phosphor the tristimulus values (x,y,z) must be known, with by definition z=1−x−y. For the red phosphor $(x_R, y_R, z_R)$ is known; for the green phosphor $(x_G, y_G, z_G)$ is known and for the blue phosphor $(x_B, y_B, z_B)$ is known. The light intensities $Y_R$, $Y_G$, $Y_B$ for the respective phosphors are regulated such that the combination of the three beams gives white light. In an additive system for a monitor, the combination of the three beams gives a colour with tristimulus values $(X_W, Y_W, Z_W)$ where $X_W$ is simply the sum $X_R+X_G+X_B$, and $X_R*Y_R/y_R$, while for the other components analogous formula are valid. The exact values for $Y_R$, $Y_G$ and $Y_B$ can be derived by solving a set of 3 thus obtained linear equations in those three unknowns. Moreover, (e.g. for a Red beam) each light-intensity $(Y_R)$ is a function of the colour signal (r), a scale factor (scale$_R$), offset (offset$_R$) and gamma $(\gamma_R)$:

$$Y_R=(r*scale_R+offset_R)\gamma_R \text{ ( means exponential function)}$$

The gamma $(\gamma_R)$ and offset (offset$_R$) are well known for each colour. The scale factor (scale$_R$) for each component is obtained by filling in the solved unknowns $(Y_R, Y_G, Y_B)$ for the maximum r, g and b values respectively. The tristimulus-colour values (X,Y,Z) for each combination (r,g,b) can then be found by the summing the amount induced by each individual phosphor. Preferentially, the amount of background light $(X_{Bg}, Y_{Bg}, Z_{Bg})$, that is homogenously reflected on the monitor towards the viewer, is added to these tristimulus colour values. As such, a more exact description of the perceived colours for each (r,g,b) value is obtained.

The second transformation c'=P(o) for the second colour imaging system can be established in the same way as described for the first colour imaging system. For a thermosublimation printer it has been found that it is advantageous to select a restricted set of output signals o that are not equidistant, but are preferentially situated on a parallelepiped mesh, or to select a fine mesh consisting of 16×16×16 measured points. Some of these points on the complete mesh can be omitted if their neighbouring points are representative for their value. If 16 equidistant points are selected for a range of 0 to 255, the values assigned can be chosen as: (0, 17, 34, 51, 68, 85, 102, 119, 136, 153, 170, 187, 204, 221, 238, 255). This gives 16×16×16=4096 measured points. It is advantageous to omit some points from the cubic mesh, in order to reduce the job of measuring all these points and to reduce the computational work. The colour c' associated with the output signal o can be measured on a transparent hard copy by a spectro-radiometer, for example Photoresearch Spectrascan type PQ-650, PQ-713pcxx or PQ-704. The colourimetric information of the colour c' on an opaque carrier can be measured by a spectro-photometer Gretag, type SPM100 or SPM50, by measuring the spectral densities under an angle of 0°, with an illumination at 45°. All systems give a list of the intensity L(λ) of radiation for a unit area and per wave length interval (expressed in Watt per steradian per square meter and per nanometer). Depending on the performance of the system, for every two or four nanometre (ten nm for Gretag) a value is obtained, between 360 nm and 780 nm. A tristimutus value for the specific measured colour can be obtained by integration over the visible wave length interval, of the spectral intensity L(λ), modulated by the red x(λ), green y(λ) and blue z(λ) eye spectral sensitivity, and the illumination conditions S(λ), e.g.:

$$X=\int_{360}^{780} S(\lambda) \cdot x(\lambda) \cdot L(\lambda) d\lambda$$

Usually, for the illumination conditions S(λ), it is supposed that the light source generates white light, uniformly distributed over the visible wave length interval. Practically, in medical environments transparent reproductions are visualised on a light box generating light with a specific spectrum. It is very advantageous, to evaluate the above integral to obtain X, and the corresponding integrals for Y and Z, using the more exact shape for the spectral distribution S(λ) of the light. This way, a more accurate tristimulus value (X,Y,Z) for the observed colour for each colour patch is obtained. It is obvious that for a transparency reproduction the light transmitted by the light box is used and for an opaque reproduction the light of the environment. Preferably, the accuracy of the observed colour signal (X,Y,Z) is even more improved, by adding to this colour signal (X,Y,Z) the background light value $(X_{Bg}, Y_{Bg}, Z_{Bg})$ of the uniformly reflected light on the carrier. This reflected light is generated in most cases by a tubular lamp, of which the spectrum S(λ) is well known. Once the tristimulus values (X,Y,Z) are known, the appropriate values for (L,H,S) can be derived by the formula well known in the art, e.g. in "The reproduction of colour in photography, printing & television" fourth edition 1987 ISBN 0 85242 356 X by R. W. G. Hunt, edited by Fountain Press, Tolworth, England, pages 116 to 119.

A thermosublimation printer tends to behave very non-linearly. Interpolation of the measured data by e.g. trilinear interpolation or high order polynomials gives serious contouring problems. Therefore approximation of the measured data by a continuous function is preferred, different from the approaches taken in the prior art cited above. This approximation is not interpolating in at least one measured point. Approximation by a high order global polynomial function results in an approximation that is not smooth in all definition areas and therefore also raises contouring problems. We therefore preferred also here a spline approximation. The smoothness of this approximation can be mastered by optimal choice of the knot points where the coefficients of the base functions change. Also here it is advantageous to minimise the object functions that gives a sum of quadratic colour distances ΔL, ΔA, ΔB in the cartesian system (L,A,B) derived from the (L,H,S) system.

As said above, a one to one mapping of the colours c on the first imaging system to the colours c' on the second imaging system is impossible for some colours, namely those outside the colour gamut of the second imaging system, and unwanted for other colours, specifically for grey tints where the luminance on the reproduction is preferably distributed such as to enhance the visual perception of different input levels. Therefore, image points having on the output of the first imaging system a colour characterised by the first colour coordinates c=(L,H,S) in a standardised colour space are preferentially transformed to image points having on the output of the second imaging system a different colour, characterised by different second colour coordinates c'=(L',H',S') in the same standardised colour space. To derive the second colour coordinates c' from the first colour coordinates c, we establish a gamut mapping function G, that transforms c to c' by c'=G(c). This gamut mapping function is a transformation from one three dimensional space to another three dimensional space and can more explicitly be described by three functions of three variables (L,H,S):

$$L'=L'(L,H,S)$$

H'=H'(L,H,S)

S'=S'(L,H,S)

Once this gamut mapping function has been established, and the first imaging system has been calibrated by a first transformation M and the second imaging system has been calibrated by a second transformation P, a general transformation T can be derived from the first transformation M, the second transformation P and the gamut mapping function G as shown in FIG. 2, wherein the transformation T can be mathematically described as $T=P^{-1} {}_oG_oM$. If M, G and $P^{-1}$ were known in analytical form, then it is possible to find an analytical expression for the transformation T that transforms each input colour signal i=(r,g,b) to an output colour signal o=(c,m,y) as three functions of three variables (r,g,b):

c=c(r,g,b)

m=m(r,g,b)

y=y(r,g,b)

This analytical expression would be however too computational intensive to be evaluated for every input colour signal i in the input image. Moreover it is difficult to invert the transformation P analytically, although it would be possible to find an analytical expression that approximates $P^{-1}$. In order to reduce to a minimum the computational effort for converting an input colour signal i to an output colour signal o, we prefer to pre-compute the transformation T on a restricted set of input signals i, preferentially ordered on a mesh of vertices of parallelepiped $i_{klj}=(r_k,g_l,b_j)$. Analogous as described above, the values for $r_k$, $g_l$ and $b_j$ can be chosen equidistantly or, depending on the behaviour of the transformation T, non-equidistantly. This restricted set of input colour signals $i_{klj}$ is used to compute the corresponding output colour signals $o_{klj}$. Therefore the input colour signal values $r_k$, $g_l$ and $b_j$ can be fed into the formula expressing the transformation c=M(i), or any other method like piecewise linear approximation to M can be used to find the first colour coordinates $c_{klj}$ according to the transformation M. Next, the gamut mapping function G is applied to the first colour coordinates $c_{klj}$ to obtain the second colour coordinates $c'_{klj}$ which represent the colour required on the second colour imaging system for a colour represented by $c_{klj}$ on the first colour imaging system. Application of the gamut function G can be done by evaluating one or a plurality of analytical expressions describing G, or can be done stepwise to correct step by step for specific features as will be described below. It is also possible that the gamut mapping function G is defined in a reduced set of points c, and that the transformed value c'kljfor $c_{klj}$ must be obtained by some form of interpolation, according to the transformation G.

The next step is to transform the second colour coordinates $c'_{klj}$ to the output colour signals o=(c,m,y). Because the second transformation P transforms the output colours o=(c, m,y) to the second colour coordinates c'=(L',H',S'), the output colours o must be obtained by reverse evaluation of the second transformation P from the second colour coordinates c'. If the second transformation P is linear or piecewise linear, this can be done by single or plural matrix inversions. Otherwise some iterative methods known in the art must be used. One such method is the Newton-Raphson iteration for three dimensions. Another useful method to invert the transformation is described in the PCT application published under number WO 94/06242. This way, finally $o_{klj}$ is found for $i_{klj}$.

The same method as described above can be used for all input colour signals belonging to the restricted set. As such, a complete mesh of input colour signals $i_{klj}$ together with the corresponding output colour signals $o_{klj}$ according to the colour transformation function T is found.

Once the transformation T has been pre-computed for a restricted set of input colour signals $i_{klj}$ on a mesh, other input colour signals i can be transformed to an output colour signal o by one of the methods described above, based on trilinear interpolation or on a weighted sum of the output values at the vertices of a tetrahedron enclosing the point i. Practical results have shown that this method to describe the transformation T still can result in regions where the transformation T behaves badly, by which is meant that one of the derivatives in one direction is too large or too small, causing visual artifacts, colour shifts and contouring. This problem can be solved by approximating back again the transformation T as precomputed on a mesh formed by the restricted set of input colour signals $i_{klj}$. This gives a continuous transformation o=T'(i), described by the following equations:

c=c(r,g,b)

m=m(r,g,b)

y=y(r,g,b)

The coefficients for the separate functions c( ), m( ) and y( ) are found by minimisation of the sum of quadratic difference between the discrete value and the function value for c, m and y respectively over the points of the mesh.

Figure 3:
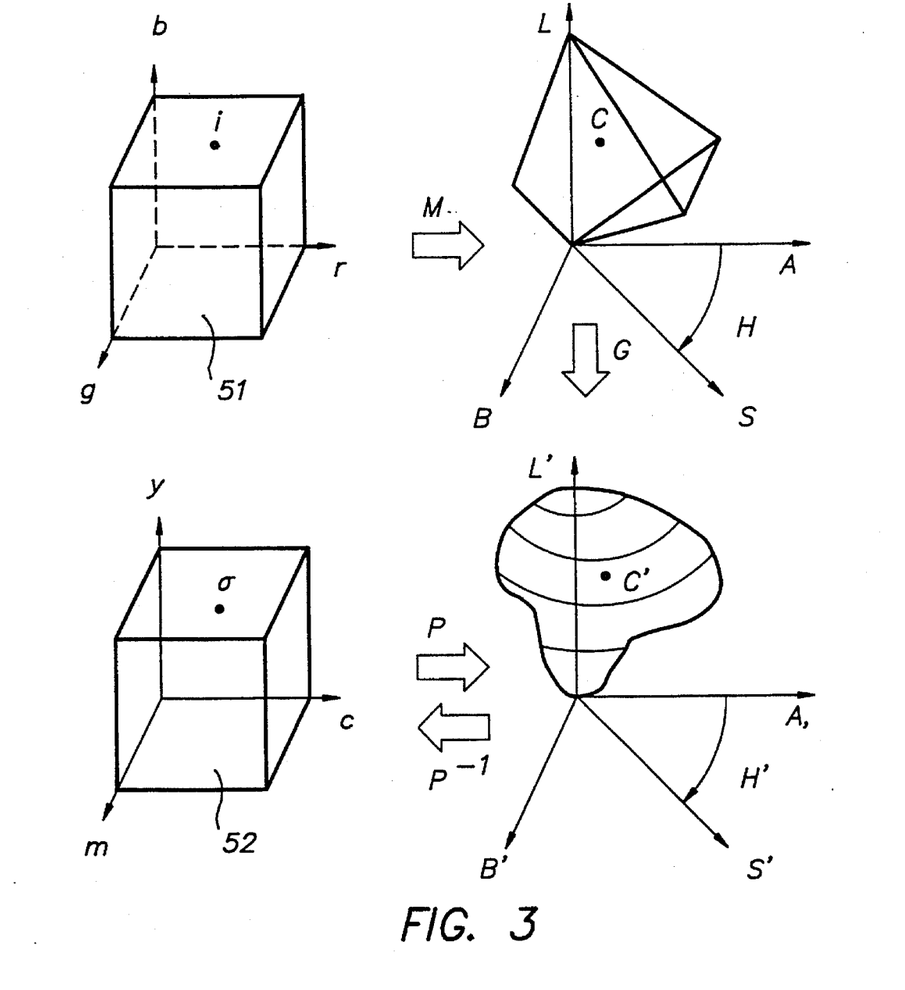
FIG. 3 is a view of the three dimensional transformations applied to transform the points within system solids to system gamuts and between system gamuts.

We refer now to FIG. 3, where we have presented the first transformation M that transforms input colour signals i to first colour coordinates c. The input colour signals i can be represented in a cartesian coordinate system (r,g,b), where r, g and b give the ranges of the separate input signals for the first colour imaging system. All input colour signals are enclosed by a first parallelepiped 51—or a cube, depending on the scaling or normalisation of the r, g, and b axes—that gives the domain of the first transformation M. The first transformation M is defined for all input colour signals within this parallelepiped 51. The first colour signals c can be represented in the polar system (L,H,S) or in the cartesian system (L,A,B). The transformation of all points i—not restricted to points with discrete or integer coordinate values, but all points within this solid—within the parallelepiped 51 gives in the (L,H,S) colour space a cloud of points with colour coordinates c. There exists an envelope that completely encloses this cloud. This envelope is a surface in the three-dimensional space and is called the first gamut boundary, belonging to the first transformation M. The first gamut boundary encloses the range of the first transformation M.

In the same way, all possible output colour signals o are enclosed in a domain for the second transformation P. This domain is a second parallelepiped 52, represented on the three orthogonal axes c, m and y. The second transformation P transforms all points o=(c,m,y) to a second colour coordinate c'. This colour coordinate c' is represented in the same polar coordinate system as above by the coordinates (L',H', S') or in the cartesian coordinate system (L',A',B'). The transformation of all points o belonging to parallelepiped 52 gives a cloud of points c' in the (L',H',S') space. The envelope of these points is called the second gamut boundary for the second transformation P.

Figure 4:
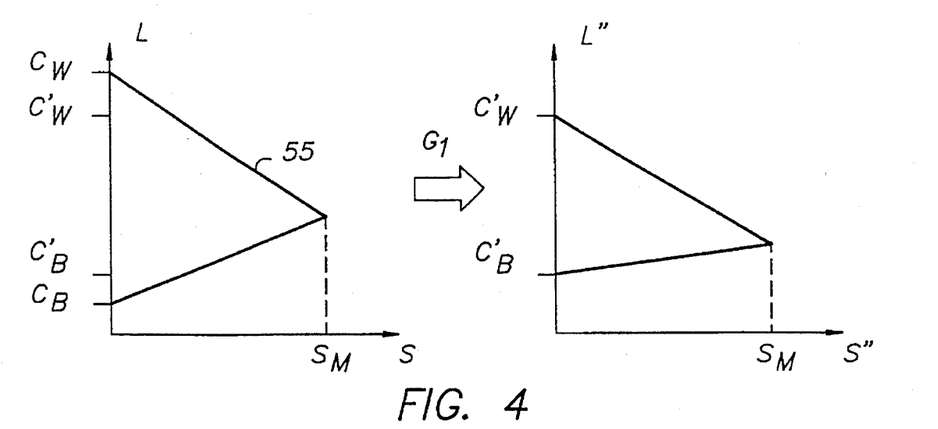
FIG. 4 displays a first transformation between system gamuts to match white and black points of the two systems.

According to the current invention, it is a first purpose of the gamut mapping function G to map important points of the first gamut boundary to corresponding points of the second gamut boundary. The gamut mapping function G is further described as a combination of a first global mapping function $G_1$ and a piecewise local gamut mapping function $G_2$, such that $G=G_2 \circ G_1$. The first boundary point mapping is shown in FIG. 4. This figure shows a two dimensional section of the three-dimensional representation of (L,H,S) in FIG. 3 in a plane at constant hue H. This plane could be for example a plane defined by the L and A axis, shown in FIG. 3, or a plane defined by the L and B axis or any other vertical plane containing the L axis. In such a vertical plane, the L axis remains vertical, while the S axis from the polar (L,H,S) system is horizontal. The first gamut boundary is also cut by the vertical plane at constant hue H, and the intersection of these two surfaces—the gamut boundary and the vertical plane—gives a gamut boundary curve 55. The gamut boundary curve will be different for different hue angles. But all these curves will converge on the same two points on the L axis. The topmost of these two points is the white point, indicated by the first colour coordinates $c_W$. The other point is the black point, indicated by the first colour coordinates $c_B$. These points have the coordinates $(L_W,0,0)$ and $(L_B,0,0)$ respectively and are the points where the L-axis intersects the first gamut boundary. To find the values for $L_W$ and $L_B$, the first transformation M is evaluated several times at points on the outer surface of the input colour value space, selecting points with saturation S=0. From these points, the point with maximum ($L_W$) and minimum ($L_B$) lightness are selected. In order to make as much as possible use of the density rendering capabilities of the second colour imaging system, it is advantageous to map these white and black points of the first imaging system to the corresponding white $c'_W=(L'_W,0,0)$ and black $c'_B=(L'_B,0,0)$ points of the second colour imaging system. These points can be found in an analogous way as described for the white point $c_W$ and black point $c_B$ of the first imaging system. These points are linearly mapped by the first gamut mapping function $G_1$. All other points in the (L,H,S) space follow accordingly. This means that a point having a maximum saturation $S_M$ for a specific hue angle H, would have the same saturation $S_M$ and the same hue angle H after the first global transformation $G_1$, but probably a different lightness L'. Mathematically, the first global transformation $G_1$, transforming all first colour coordinates c=(L,H,S) to linear lightness mapped colour coordinates c"=(L",H",S") is given by:

$$L''=a*L+b$$

$$H''=H$$

$$S''=S$$

The constants a and b are computed such that:

$$L'_W=a*L_W+b$$

$$L'_B=a*L_B+b$$

By this first transformation $G_1$, all points on the L-axis have a one to one relation to points on the L'-axis, within the range of the second transformation P, and can thus inversely been transformed to get an output colour signal o=(c,m,y). The coefficients a and b are independent of the hue angle H. The right hand side of FIG. 4 shows how the first gamut boundary curve is transformed accordingly. It is obvious that the points on the L-axis coincide with the corresponding points on the L'-axis of the second gamut boundary curve for this specific hue angle.

Figure 5:
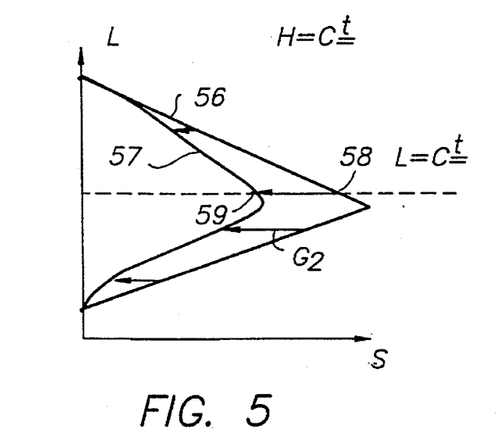
FIG. 5 shows a second transformation that matches the gamuts of two devices by keeping the lightness and hue constant.

In FIG. 5 we describe a second transformation $G_2$ that is performed on the linear lightness mapped colour coordinates c". This figure shows again a section of the three dimensional space at a constant hue angle H. The curve 56 is the linear lightness mapped first gamut boundary curve, the curve 57 represents the second gamut boundary curve, obtained by intersection of the vertical plane at constant hue angle with the second gamut boundary. We map all the points of the curve 56 to the points on the curve 57 via a horizontal translation. All other points on the same horizontal line—meaning all points having the same lightness L—are shifted accordingly. Thus the transformation $G_2$ can be described mathematically as:

$$L'=L''$$

$$H'=H''$$

$$S'=sc*S''$$

The linear scaling factor sc is dependent on the Hue H" and the lightness L". This factor is computed such that the point 58 on the intersection of a line of constant lightness 60 with the linear lightness mapped first gamut boundary curve 56 is mapped to the point 59 on the intersection of the same line of constant lightness 60 and the curve 57 representing the second gamut boundary curve. If point 58 has coordinates $(L'',H'',S''_b)$ and point 59 has coordinates $(L'',H'',S'_b)$ accordingly, then the linear scaling factor sc is found as: $sc=S'_b/S''_b$.

The piecewise linear transformation $G_2$ combined with the global linear transformation $G_1$ transforms the first gamut boundary to the second gamut boundary and all points enclosed by the first gamut boundary accordingly to points enclosed by the second gamut boundary. All points c' transformed from c by the gamut mapping function $G=G_2 \circ G_1$, can be further inverted by the transformation $P^{-1}$.

As discussed above, grey tints are very important in medical diagnostic images. The slightest variations must be discernible there. In order to increase the visual perceptibility of differences in input colour signals for grey tints, these colour signals can be preferentially mapped to a curve with optimal visual perceptibility. In the past, studies have been performed by e.g. Hitoshi Kanamori and published in "Determination of optimum film density range for roentgenograms from visual effects" in Acta Radiologica Diagnosis, Vol. 4 (1966). This study teaches that small density differences are visible in areas with low density and the discernible density difference ΔD increases with the density D. In order to achieve optimum perceptibility, the input colour signals for grey colours are preferably mapped according to a curve where the density increments are bigger for larger density values. If 256 intensity levels are given, which must be mapped to 256 density levels $D_0, D_1, \ldots D_{255}$, distributed between a minimal density $D_{min}$ and a maximal density $D_{max}$ such that the density differences are small for low densities and large for higher densities, then the successive densities can be found from the following difference equation with two boundary conditions:

$$D_{i+1}=D_i-\ln(1-C*e^{D_i})$$

$$D_0=D_{min} \quad (1)$$

$$D_{255}=D_{max} \quad (2)$$

The value for C must be selected such, that the second boundary condition (2) is fulfilled, when $D_0$ is started with the first condition (1). The value for C can be found iteratively.

This type of transformation to obtain maximal visual perception must be applied to all input colour signals i=(r,g,b) that give on the first imaging system a grey tint.

This means that the first transformation M transforms the input colour signals to first colour coordinates c=(L,H,S), with S=0, giving all points situated on the L-axis. According to the first linear transformation, these points are transformed to the linear lightness mapped colour coordinates c"=(L",H",0). All the points on the L"-axis are then, according to a maximal visual perception transformation L'=$G_3$(L") transformed to arrive to maximal visual perceptible colour coordinates c'=(L',H",0). The full transformation $G_3$ is thus given by:

$$L'=G_3(L")$$

$$H'=H" (\text{don't care})$$

$$S'=S"(=0)$$

Figure 6:
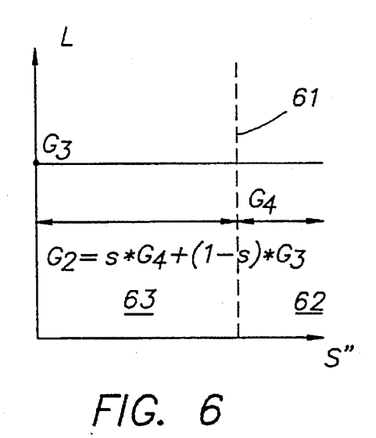
FIG. 6 shows a gamut mapping for optimal visual perception of grey levels and faithful reproduction of colours.

All other points not situated on the L"-axis must also undergo a transformation. Most importantly, all points, that are still enclosed by the first gamut boundary, must be transformed to points that are enclosed by the second gamut boundary. Further, the points close to the L-axis must be transformed such that the maximal visual perception transformation $G_3$ does not introduce discontinuities. To realise the first object, a transformation as described above and here identified by $G_4$ can be applied. To realise the second object, the transformation $G_4$ is applied only to points outside a cylinder around the L"-axis. For all points within the cylinder around the L"-axis, a linear combination of the transformations $G_3$ and $G_4$ is applied, such that for points close to the L"-axis the perception transformation $G_3$ prevails, while for points close to the cylinder surface, the gamut boundary transformation $G_4$ is more important. The cylinder contains all points with a low colour saturation. The more greyish the colour, the more it is transformed according to the maximal visual perceptibility, by modification of the lightness. For a higher the saturation, the lightness is kept constant, while the saturation is modified to bring the first and second gamut boundary together. In all these cases, the hue H is not changed. In the polar coordinate system (L",H",S"), a cylinder centered along the L"-axis is described by the equation S"=$S_0$. In FIG. 6 we represented a vertical section along the axis of the cylinder. The cylinder surface is situated at 61, the line with S"=$S_0$. The value for $S_0$ is chosen such that the cylinder is contained completely within the first gamut boundary, except for some small parts at maximal and minimal lightness. All points 62 outside the cylinder are characterised by the fact that their saturation S" is higher than the pre-defined saturation $S_0$. For all the points having a saturation S" higher than the pre-defined saturation $S_0$, the gamut boundary transformation $G_4$ is applied to deliver the second colour coordinates c'=(L',H',S'). This transformation—as described above—keeps the lightness L" and the hue angle H" constant and modifies S" in a linear way such that the first gamut boundary point (L",H",$S"_b$), found by the intersection of the first gamut boundary with a line having lightness L" and hue angle H" is mapped to the second gamut boundary point (L",H",$S'_b$), found by the intersection of the second gamut boundary with said line having lightness L" and hue angle H". Thus the transformation $G_4$ is given by:

$$L'=L"$$

$$H'=H"$$

$$S'=sc*S"$$

As before, the scaling factor sc is given by sc=$S'_b$/$S"_b$. The transformation $G_4$ is thus a linear transformation in S".

Because the scaling factor sc is different for each different lightness L" and each different hue angle H", the transformation $G_4$ is piecewise linear.

For all points 63 within the cylinder with radius $S_0$ and centered along the L" axis, the saturation S" is lower or equal to the pre-defined saturation $S_0$. The points within this cylinder undergo a linear combination of the transformations $G_3$ and $G_4$, that can be identified by the following equations:

$$L'=(1-s)*G_3(L")+s*L"$$

$$H'=H"$$

$$S'=s*sc*S"$$

$$s=S"/S_0$$

Another gamut mapping function having the advantage of preserving the saturation of the colours will now be described in conjunction with FIG. 7. This type of gamut mapping can be applied whenever the maximum saturation $S_1$ of the first colour imaging system at a specific hue angle $H_0$ is not higher than the saturation $S_2$ of the second colour imaging system at the same hue angle $H_0$. As before, in a vertical section along the L-axis, characterised by a constant hue angle H=$H_0$, the L-axis displays vertically the lightness of the linear lightness mapped colour coordinates c"=(L",H",S") and the S-axis displays horizontally the saturation of said coordinates c". The curve 64 displays the (linear lightness mapped) first gamut boundary curve. This curve is the intersection of the vertical plane H=$H_0$ with the first gamut boundary. The curve 65 displays the second gamut boundary curve. This curve is the intersection of the vertical plane H=$H_0$ with the second gamut boundary. Because the first colour coordinates are linearly mapped already to the linear lightness mapped colour coordinates c", both curves 64 and 65 have identical points of intersection on the L-axis. The restriction that the first maximum saturation $S_1$ must not be higher than the second maximum $S_2$, can be identified on FIG. 7 by the point $S_1$ situated closer to the origin than $S_2$. All points with colour coordinates c"=(L",H",S") will now undergo a linear transformation that preserves the hue angle H" and the saturation S". The lightness L" will be transformation linearly to the lightness L'. This gamut mapping function $G_2$ is mathematically described as follows:

$$L'=f*L"+g$$

$$H'=H"$$

$$S'=S"$$

Figure 7:
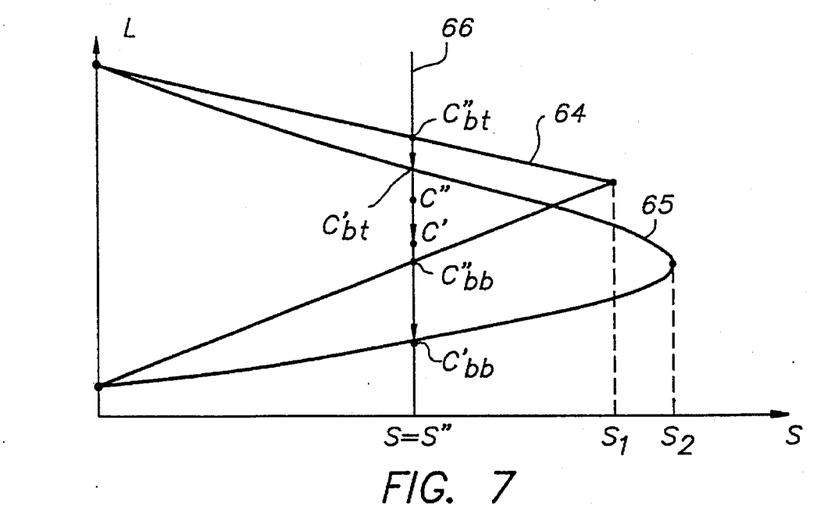
FIG. 7 shows agamut mapping variation keeping the saturation or the lightness constant for identical hue.

As shown in FIG. 7, the linear lightness mapped colour coordinates c" and the second colour coordinates c' are situated on the same vertical line 66 with equation S=S". The transformation $G_2$ must be such that the first top boundary point $c"_{bt}$=($L"_{bt}$,H",S") is mapped to the second top boundary point $c'_{bt}$=($L'_{bt}$,H",S") and that the first bottom boundary point $c"_{bb}$=($L"_{bb}$,H",S") is mapped to the second bottom boundary point $c'_{bb}$=($L'_{bb}$,H",S"). These both requirements can be used to establish the values for f and g. These are solved from the linear system:

$$L'_{bt}=f*L"_{bt}+g$$

$$L'_{bb}=f*L"_{bb}+g$$

Thus f and g are given by:

$$f=(L'_{bt}-L'_{bb})/(L"_{bt}-L"_{bb})$$

$$g=(L"_{bb}*L'_{bt}-L"_{bt}*L'_{bb})/(L"_{bb}-L"_{bt})$$

As soon as the difference ($L''_{bb}-L''_{bl}$) becomes too small, which happens when c" approaches the point with coordinates ($L''$,$H''$,$S_1$) and which could cause an arithmetic overflow condition in the computation of f and g, then the colour coordinates c" are mapped to the closest second boundary point when they are outside the second gamut boundary and are not transformed when they are within the second gamut boundary.

This method again can be combined with the above described maximal visual perception transformation, in the same way as the last one was combined with the linear saturation transformation that kept the lightness and hue angle constant. Along the lightness axis L", the linear lightness mapped colour coordinates c" are non-linearly transformed according to a transformation $G_3$ to obtain maximal visual perception. All points c" situated outside a cylinder centered along the L-axis are transformed such that the saturation and hue angle are kept constant and that points having the same hue angle and saturation undergo the same linear transformation in lightness. Points outside said cylinder have a saturation higher than a pre-defined saturation $S_0$ that defines the surface of the cylinder. The linear transformation in lightness L for a specific saturation $S_c$ is such that the two points of intersection of the first gamut boundary curve—formed by the intersection of the vertical plane at constant hue angle and the first gamut boundary—with the line of constant saturation $S_c$ are transformed to the corresponding two points of intersection of the second gamut boundary curve with said line of constant saturation $S_c$. For all points within the cylinder $S=S_0$, a linear combination of the piecewise linear lightness transformation and the maximal visual perception transformation is performed. Therefore, the lightness L" of the linear lightness mapped colour coordinates c"=(L",H",S") is considered. The line having said lightness L" and a hue angle H" crosses the cylinder surface at point (L",H",$S_0$). For this point, the linear transformation for L" is computed. L'=f*L"+g. Thus f and g are computed from the intersection of the line of constant saturation $S=S_0$ with the first and second gamut boundary curves. The final transformed values for the point c"=(L", H",S") within the cylinder are then given by:

$$L'=s*(f*L''+g)+(1-s)*G_3(L'')$$

$$H'=H''$$

$$S'=S''$$

wherein s is given by $s=S/S_0$.

In order to avoid the above mentioned overflow condition, to use optimally the full scala of saturation offered by the second colour imaging system and to have a solution for situations where the maximum saturation of the first colour imaging system is higher than the maximum saturation of the second colour imaging system for a specific hue angle, a second linear mapping can be superimposed on the global linear lightness mapping as discussed above. This second linear mapping expands or contracts the first boundary curve 64 as shown in FIG. 7 in the horizontal direction along the saturation axis such that the first maximum saturation $S_1$ coincides with the second maximum saturation $S_2$. All points situated on or enclosed by the first gamut boundary curve are translated horizontally accordingly. This second linear mapping is further called linear saturation mapping, because it affects the saturation only. It can be characterised by the following transformations:

$$L'''=L''$$

$$H'''=H''$$

$$S'''=sc*S''$$

The linear scaling factor sc is given by the ratio: $sc=S_2/S_1$. The scaling factor sc depends on the hue angle H" only.

Once the linear saturation mapping has been performed on all linear lightness mapped colour coordinates c", the methods described above in conjunction with FIG. 7 can be applied. Therefore, the linear saturation mapping can be combined in the $G_1$ transformation that first of all linearly maps the lightness as to make the white point and black point on the lightness axis to coincide, and then linearly maps the saturation, based on a scaling factor that is hue dependent.

As stated in the introduction, some colours visually seem to shift to other hue angles when they are mapped from the first imaging system to the second imaging system, while keeping the hue angle constant. This can be due to the light conditions of the environment or the illumination of the output of the second colour imaging system, or due to large differences obtained in lightness or saturation by application of the gamut mapping function. These colour changes are visually objectionable and can be cured by a local hue transformation. Local means here that to a certain range of hue angles a hue difference is assigned, and that for other ranges of hue angles, the hue remains unchanged. This change in hue angle must be applied before the linear saturation mapping, because the scaling factor for the linear saturation mapping is hue dependent. The range of hue angles that are affected and the magnitude of hue difference introduced are preferentially given interactively by the operator. The hue difference must decrease as the borders of the affected hue range are reached. The amount of decay has not to be symmetrical around the point of maximum difference. In a first approach, the operator gives the hue angle for maximum hue difference, gives there the hue difference and gives the two hue angles where the hue must be left unchanged. From this information a linear decay at both sides of the central hue angle can be imposed on first colour matching function $G_1$.

From the above description, it becomes clear that it is of utmost importance to have information about the input colour signals i and the output colour signals o for specific hue angles. The position of the first and second gamut boundary curves must be known for identical hue angles. Therefore it is important to know how these gamut boundary curves are positioned in the i=(r,g,b) space and the o=(c,m,y) space. The gamut boundary curves are by definition all situated on the respective gamut boundary. We can assume that the first gamut boundary in the (L,H,S) space is transformed to the surface of the cube formed by the possible (r,g,b) values for the input colour signals. Analog to this, we assume that the second gamut boundary in the (L',H',S') space is transformed to the surface of the cube formed by the possible (c,m,y) values for the output colour signals. The first gamut boundary curve at a specific hue angle in the input colour signals space is preferentially obtained by a method that searches for points of equal hue H in the transformation c=M(i). Once these curves of equal hue are established, it is possible to locate the point of maximum saturation $S_1$, necessary for some of the methods described above.

Although the present invention has been described with reference to preferred embodiments, those skilled in the art will recognise that changes may be made in form and detail without departing from the spirit and scope of the invention.

The reference numerals in the attached drawing figures correspond as follows:

31. First colour imaging system

32. Second colour imaging system

33. Digital image information
34. Image pixel
35. (L,H,S) coordinate system for the first colour imaging system
36. Colour transformation unit
37. Image reproduction on hard copy
38. (L',H',S') coordinate system for the second imaging system
39. First transformation system model
40. Second transformation system model
41. First transformation unit
42. Gamut transformation unit
43. Inverse transformation unit
51. First parallelepiped
52. Second parallelepiped
55. Gamut boundary curve
56. Linear lightness mapped first gamut boundary curve
57. Second gamut boundary curve
58. Intersection of line of constant lightness with linear lightness mapped first gamut boundary curve
59. Intersection of line of constant lightness with second gamut boundary curve
61. Section of cylinder surface by vertical plane
62. Points outside the cylinder $S<S_0$
63. Points within the cylinder $S<S_0$
64. First gamut boundary curve
65. Second gamut boundary curve
66. Vertical line $S=S''$

We claim:

1. A method for reproducing a colour image represented by input colour signals i in a system comprising:

a first colour imaging system driven by said input colour signals i for imaging said colour image, each colour of said colour image having colour coordinates c in a pre-defined colour coordinate system and a second colour imaging system driven by output colour signals o for imaging the reproduction of said colour image, each colour of said reproduction having colour coordinates c' in said pre-defined colour coordinate system;

and for obtaining a colour appearance match between:

said colour image on said first colour imaging system and said reproduction on said second colour imaging system;

comprising the following steps:

determining, by calibrating the first imaging system, a first transformation M: c=M(i) that transforms the input colour signals i to the colour coordinates c;

determining, by calibrating the second imaging system, a second transformation P: c'=P(o) that transforms the output colour signals o to the colour coordinates c' including the steps of:

imaging a restricted set of output colour signals o on said second colour imaging system;

measuring the colour value c' corresponding to said output colour signals o; and establishing a function, defined over all possible output colour signal values o, that approximates said measured colour values c' when it is evaluated in said restricted set of output colour signals;

deriving from said first and second transformation a colour transformation T: o=T(i) for transforming said input colour signals i to said output colour signals o;

producing an output colour signal o from each said input colour signal i from the image, according to said colour transformation T; and driving said second imaging system by said output signals o to reproduce said colour image.

2. The method of claim 1 wherein the step of determining said first transformation M comprises the following steps:

imaging a restricted set of input colour signals i on said first colour imaging system;

measuring the colour value c corresponding to said input colour signals i.

3. The method of claim 2 further comprising the step of establishing a function M, defined over all possible input colour signal values i, that approximates said measured colour values c when it is evaluated in said restricted set of input colour signals.

4. The method of claim 3, wherein said approximating function M is a spline function and the coefficients of the spline function are found by minimisation of the quadratic sum of the colour distance between the function and the measured colour values over said restricted set.

5. The method of claim 1 wherein the step of determining the first transformation M comprises the following steps:

establishing the characteristics of the first colour imaging system;

determining said first transformation M based on a model and the characteristics of said first system.

6. The method of claim 2 wherein the measurement of said colour value c corresponding to said input colour signals i takes the background illumination into account.

7. The method of claim 1, wherein said approximating function P is a spline function and the coefficients of the spline function are found by minimisation of the quadratic sum of the colour distance between the function and the measured colour values over said restricted set.

8. The method of claim 1, wherein the measurement of said colour value c' corresponding to said output colour signals o takes into account:

the spectral distribution of an illumination means for visualisation of the reproduction;

the spectral background illumination.

9. The method of claim 1 wherein the step of deriving said colour transformation further comprises the following steps:

(a) establishing a colour gamut mapping function G: c'=G(c);

(b) selecting a restricted set of input colour signals i;

(c) finding a first colour value c, according to the first transformation M, corresponding to an input colour signal i from said set;

(d) transforming the first colour value c to a second colour value c' according to said colour gamut mapping function c'=G(c);

(e) finding an output colour value o according to the second colour value c' by reverse evaluation of the second transformation P and (f) repeating steps (c) to (e) for all input colour signals i belonging to said restricted set.

10. The method of claim 9, wherein:

the pre-defined colour coordinate system has a lightness axis L, a hue angle H and a polar saturation axis S such that c=(L,H,S) and c'=(L',H',S');

the envelope of all possible input colours signals i transformed by the first transformation M defines a first gamut boundary;

the envelope of all possible output colours signals o transformed by the second transformation P defines a second gamut boundary;

the colour gamut mapping function G: c'=G(c), is composed of a global linear transformation $G_1$ that affects L only followed by a transformation $G_2$;

the transformation $G_1$ transforms the two points of intersection of the L axis with the first gamut boundary to the corresponding two points of intersection of the L axis with the second gamut boundary.

11. The method of claim 10, wherein the transformation $G_2$ along a line of constant hue H and constant lightness L is linear in S and projects the point of intersection of said line with the first gamut boundary to the point of intersection of said line with the second gamut boundary.

12. The method of claim 10, wherein the transformation $G_2$:

along the lightness axis L non-linearly transforms the points according to a transformation $G_3$ to obtain maximal visual perception;

along a line of constant hue H and constant lightness L, and for a saturation S higher than a pre-defined saturation $S_0$ is a linear transformation $G_4$ in S that projects the point of intersection of said line with the first gamut boundary to the point of intersection of said line with the second gamut boundary.

along said line and for a saturation S not higher than said pre-defined saturation $S_0$, is a linear combination that is linear in S of said non-linear transformation $G_3$ and said linear transformation $G_4$.

13. The method of claim 10, wherein the transformation $G_2$ along a line of constant hue H and constant saturation S is linear in L and projects both points of intersection of said line with the first gamut boundary to the corresponding two points of intersection of said line with the second gamut boundary.

14. The method of claim 10, wherein the transformation $G_2$:

along the lightness axis L non-linearly transforms the points according to a transformation $G_3$ to obtain maximal visual perception;

along a first line of constant hue H and constant saturation S and for a saturation S higher than a predefined saturation $S_0$ is a linear transformation $G_4$ in L that projects both points of intersection of said line with the first gamut boundary to both corresponding points of intersection of said line with the second gamut boundary.

along a second line of said constant hue H and constant lightness L and for a saturation S not higher than said pre-defined saturation $S_0$, is a linear combination that is linear in S of:

said non-linear transformation $G_3$ and said linear transformation $G_4$ in the point of intersection of said second line and the line $S=S_0$.

15. The method of claim 10, wherein the transformation $G_1$ further comprises a linear saturation mapping function that linearly transforms the saturation such that the maximum saturation for the first colour gamut boundary at a specific hue angle is transformed to the maximum saturation for the second colour gamut boundary at said specific hue angle.

16. The method of claim 10, wherein the transformation $G_1$ further comprises a transformation $G_5$ that locally affects only the hue H.

17. The method of claim 9, wherein the step of establishing a colour gamut transformation G includes the followings steps:

finding the loci of the first gamut boundary by reverse evaluation of the first transformation M at a pre-defined set of hue values $H_i$ and finding the loci of the second gamut boundary by reverse evaluation of the second transformation P at said pre-defined set of hue values $H_i$;

and wherein said loci are sought only between the points found by transformation of the points located on the surface of the cubes in the input colour signals i space or output colour signals o space respectively.

18. The method of claim 1, wherein the step of deriving said colour transformation further comprises the following steps:

selecting a set of input colour signals $i_j$;

computing for each input colour signal $i_j$ the corresponding output colour signals $o_j$, based on the first and second transformation;

defining the transformation T as a function that approximates said corresponding output colour signals $o_j$ as a function of the input colour signals $i_j$.

* * * * *

UNITED STATES PATENT AND TRADEMARK OFFICE
CERTIFICATE OF CORRECTION

PATENT NO. : 5,596,428
DATED : January 21, 1997
INVENTOR(S) : Tytgat et al.

It is certified that error appears in the above-indentified patent and that said Letters Patent is hereby corrected as shown below:

<u>Column 9, line 14</u>, "$X_R*Y_R/Y_R$" should read --$X_R = x_R*Y_R/Y_R$--;

<u>Column 11, line 50</u>, "c'kljfor" should read --$c'_{klj}$ for--;

<u>Column 16, line 14</u>, "s=S"/$S_0$" should read --with s=S"/$S_0$--;

<u>Column 20, line 26</u>, "approximating function" should read --second transformation--.

Signed and Sealed this

Eighth Day of July, 1997

Attest:

BRUCE LEHMAN

*Attesting Officer*   *Commissioner of Patents and Trademarks*